(12) United States Patent
Narin et al.

(10) Patent No.: US 11,697,157 B2
(45) Date of Patent: Jul. 11, 2023

(54) INCINERATION APPARATUS AND METHOD

(71) Applicant: DOOSAN LENTJES GMBH, Nordrhein-Westfalen (DE)

(72) Inventors: Oguzhan Narin, Sprockhövel Nordrhein-Westfalen (DE); Björn Brosch, Essen Nordrhein-Westfalen (DE); Andreas Karpinski, Wuppertal (DE)

(73) Assignee: DOOSAN LENTJES GMBH, Nordrhein-Westfalen (DE)

( * ) Notice: Subject to any disclaimer, the term of this patent is extended or adjusted under 35 U.S.C. 154(b) by 281 days.

(21) Appl. No.: 17/268,950

(22) PCT Filed: Aug. 28, 2019

(86) PCT No.: PCT/EP2019/072921
§ 371 (c)(1),
(2) Date: Feb. 16, 2021

(87) PCT Pub. No.: WO2020/043759
PCT Pub. Date: Mar. 5, 2020

(65) Prior Publication Data
US 2021/0252597 A1    Aug. 19, 2021

(30) Foreign Application Priority Data
Aug. 29, 2018   (EP) ..................... 18191498

(51) Int. Cl.
*B22F 9/22*   (2006.01)
*F23C 10/00*  (2006.01)
*C25B 1/04*   (2021.01)

(52) U.S. Cl.
CPC ............... *B22F 9/22* (2013.01); *F23C 10/00* (2013.01); *C25B 1/04* (2013.01);
(Continued)

(58) Field of Classification Search
None
See application file for complete search history.

(56) References Cited

U.S. PATENT DOCUMENTS

| | | | | |
|---|---|---|---|---|
| 4,204,033 A | * | 5/1980 | Meissner | .............. H01M 8/004 429/465 |
| 5,044,934 A | | 9/1991 | Gutel et al. | |

(Continued)

FOREIGN PATENT DOCUMENTS

| | | |
|---|---|---|
| DE | 102012101729 A1 | 9/2013 |
| JP | 2011179773 A | 9/2011 |

(Continued)

OTHER PUBLICATIONS

"A novel gas turbine cycle with hydrogen-fueled chemical-looping combustion", Hongguang Jin et al., International Journal of Hydrogen Energy, vol. 25, No. 12, pp. 1209-1215, Dec. 2000, published on Dec. 31, 2000.

(Continued)

*Primary Examiner* — George Wyszomierski
(74) *Attorney, Agent, or Firm* — Invenstone Patent, LLC

(57) ABSTRACT

The invention relates to an Incineration apparatus, comprising a fluidized bed redox reactor (2) having—a reaction chamber (8) with particulate matter and—a fluidized bottom with at least one reducing agent inlet (9) for a gas to fluidize the particulate matter.

10 Claims, 1 Drawing Sheet

(52) U.S. Cl.
CPC ............... *F23C 2900/10001* (2013.01); *F23C 2900/99008* (2013.01); *F23L 2900/07005* (2013.01)

(56) References Cited

U.S. PATENT DOCUMENTS

| | | |
|---|---|---|
| 2009/0072538 A1 | 3/2009 | Morin et al. |
| 2018/0062190 A1* | 3/2018 | Redwine ............. C01B 13/0207 |
| 2022/0379280 A1* | 12/2022 | Narin ...................... F23C 10/20 |

FOREIGN PATENT DOCUMENTS

| | | | |
|---|---|---|---|
| WO | WO-2011116141 A2 * | 9/2011 | |
| WO | WO-2014173665 A1 * | 10/2014 | |
| WO | WO-2017127886 A1 * | 8/2017 | |
| WO | WO-2019050397 A1 * | 3/2019 | |

OTHER PUBLICATIONS

A Chinese Office Action dated Dec. 21, 2022 in connection with Chinese Patent Application No. 201980055039.4 which corresponds to the above-referenced U.S. application.

* cited by examiner

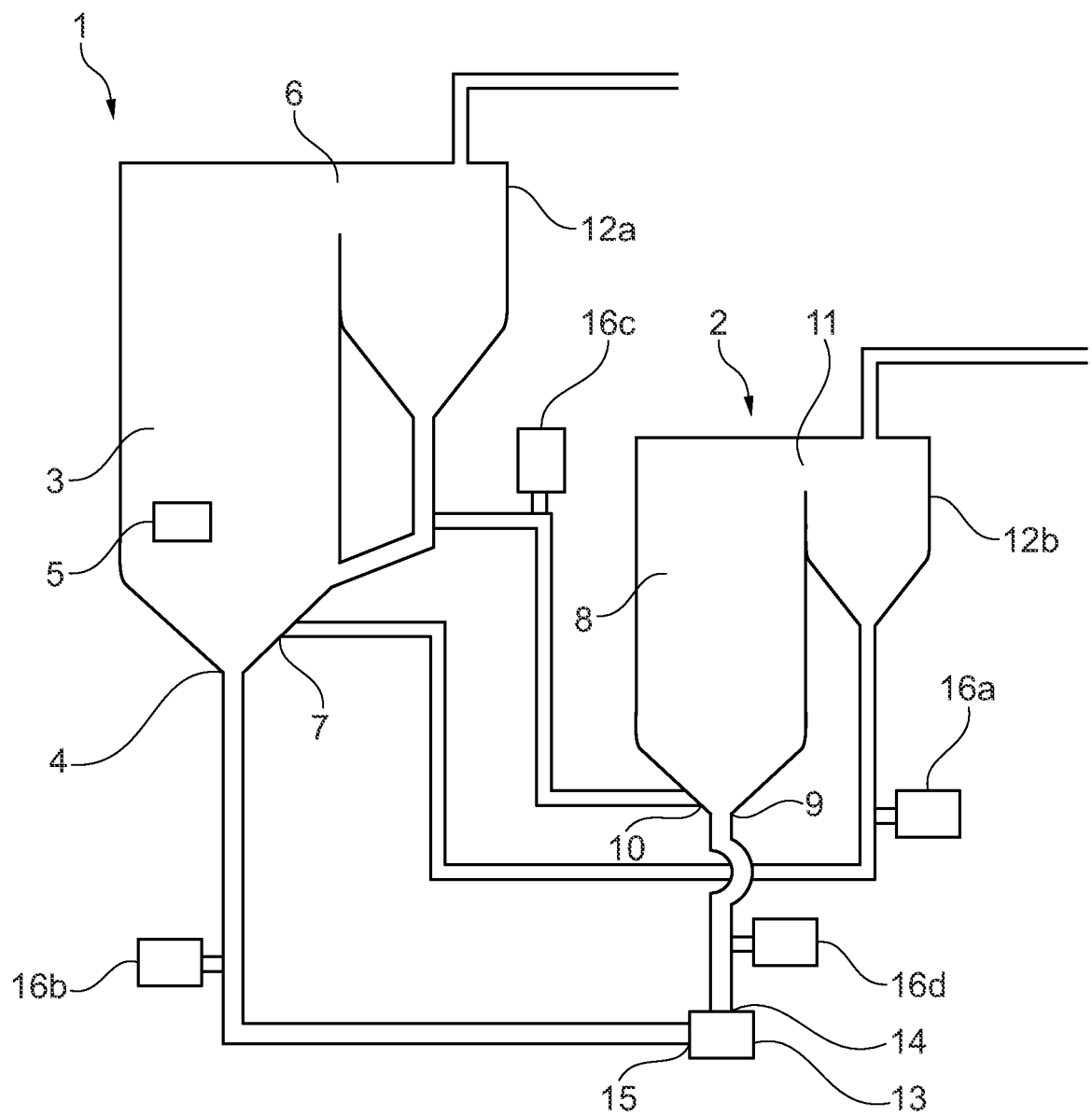

INCINERATION APPARATUS AND METHOD

CROSS-REFERENCE TO RELATED APPLICATION

This application is a national stage of International Application No. PCT/EP2019/072921, filed on Aug. 28, 2019.

BACKGROUND

Technical Field

The present invention relates to an incineration apparatus comprising a combustor to combust metal in order to generate thermal energy. The thermal energy might be used produce electric energy.

Related Art

When metal (such as Fe or Zn) is combusted with air metal oxide (such as FeO or ZnO) is produced. The combustion gases comprise nitrogen oxide and eventually other contaminations, which have to be elaborately removed, for example by a selective catalytic reaction (SCR) as combustion gas after treatment.

An incineration apparatus and a method with the features of the preamble of claims 1 and 6 are known from US 2009/072538 A1.

Additionally, the produced metal oxides have to be disposed or supplied to a further application.

SUMMARY

Against this background, it is an object of the invention to provide an incinerator apparatus and a method to operate such incinerator apparatus, with which the metal oxides can be further used efficiently.

This object is achieved with an incineration apparatus and a method for operating the incineration apparatus according to the features of the respective independent claims. Preferred embodiments of the incineration apparatus and the method are subject matter of the dependent claims and the description, wherein single features of the preferred embodiments can be combined with each other in a technically meaningful manner.

The object is in particular solved with an incineration apparatus, comprising a fluidized bed redox reactor having a reaction chamber with particulate matter comprising particulate metal oxide and a fluidized bottom with at least one reducing agent inlet for an hydrogen containing gas to fluidize the particulate material, wherein in the resulting fluidized bed the particulate metal oxide react with the hydrogen to particulate metal and water.

The object is also solved with a method for operating an incineration apparatus, comprising the following steps: providing particulate metal oxide to a reaction chamber of a fluidized bed redox reactor, providing a hydrogen containing gas to a fluidized bottom of the fluidized bed redox reactor such that the particulate metal oxide is fluidized, wherein the particulate metal oxide react with the hydrogen to particulate metal and water (water steam).

The incineration apparatus comprises a combustor, in which metal is combusted to metal oxide, wherein the resulting particulate metal oxide (eventually after separation from the combustion gases and after further treatment) is provided to the fluidized bed redox reactor.

BRIEF DESCRIPTION OF THE DRAWINGS

FIG. 1 illustrates an exemplary embodiment of the invention.

DETAILED DESCRIPTION

The invention has the advantage that the (particulate) metal oxide produced in the combustor can be reconverted to metal in a redox reaction, which takes place within the fluidized bed redox reactor highly efficient, as the contact between the particulate matter comprising the particulate metal oxide and the hydrogen is greatly enhanced within the fluidized bed, whereby also the heat transfer is enhanced. Depending on the velocity of the provided hydrogen the fluidized bed can be embodied as stationary, bubbling or circulating fluidized bed. This way the particulate metal oxide can be transferred to particulate metal, which can be easily stored and which can be used in the combustor again on demand.

The particulate matter (loose filling) within the reaction chamber may comprise further particulate solids in addition to the particulate metal oxide. In particular, the further particulate solids may be particulate metal. Hereinafter terms like "upper", "lower", "horizontal", "vertical", "inner" etc. always refer to a regular use position of the incineration apparatus.

The general process engineering of this type of a fluidized bed apparatus is more or less defined and includes: providing the particulate matter via an inlet opening, fluidizing the particulate matter by a gas, introduced under pressure via corresponding nozzles and/or a grate in the bottom area of the respective chamber (fluidized bottom), transferring the energy (heat), produced in the fluidized bed, via heat transfer elements (in particular tubes, through which a heat transfer fluid like water or steam flows), arranged in or adjacent to the chamber, into said fluid.

Depending on the velocity of the provided gas the fluidized bed can be embodied as stationary, bubbling or circulating fluidized bed. The walls of such a fluidized bed apparatus may be made of tubes, through which water runs, wherein said tubes are either welded directly to each other to provide a wall structure or with fins/ribs between parallel running tube sections. This way heat can be withdrawn from or provided to the chamber comprising the fluidized bed.

Typically, the fluidized bed apparatus has at least one outlet port (or chamber outlet) at its upper end, wherein said outlet port allows a mixture of gases and solid particles (also called particulate matter) exhausted from the chamber, to flow into at least one associated separator.

The separator serves to disengage the gases and solids. Thereafter the separated flue gases and solids are treated separately. The solids are either directly returned into the chamber and/or may be fed to a further application such as an intermediate heat exchanger, in particular into at least one Fluidized Bed Heat Exchanger (FBHE), to a storage vessel or to a further fluidized bed apparatus.

The combustor for combustion of the metal is embodied as fluidized bed combustor having a combustion chamber with particulate matter comprising particulate metal, a fluidized bottom with at least one oxidizer inlet for an oxygen containing gas to fluidize the particulate matter and an ignition device embodied to at least locally raise the temperature to cause an exothermic combustion reaction of the particulate metal with the oxygen containing gas.

Accordingly, the method comprises the steps of: providing particulate metal to a combustion chamber of a fluidized bed combustor, providing an oxygen containing gas to a fluidized bottom of the fluidized bed combustor such that particulate matter comprising the particulate metal is fluidized, and raising at least locally the temperature to cause an exothermic combustion reaction of the particulate metal with the oxygen containing gas.

Accordingly, it is suggested that particulate (elementary) metal as a fuel is used in a fluidized bed combustor, so that the thermal energy (heat) of the combustion process can be withdrawn by respective heat exchange means (for example tubes with heat exchange medium) for further use. By using a fluidized bed to combust the particulate metal the contact between the particles (particulate metal) and the oxygen containing gas is greatly enhanced, whereby the reaction and heat transfer is enhanced. By using metal as a fuel, it can be avoided that contaminations within the combustion process such as sulphur are involved, so that an elaborate combustion gas treatment can be avoided.

In addition to the particulate metal the particulate matter within the combustion chamber may comprise (inert) carrier material, which does not react with the oxygen, so that the combustion process can be controlled by the ratio of particulate metal and particulate carrier material. In particular, the particulate carrier material is made of metal oxide, which is initially provided and/or which is produced by the combustion process of the particulate metal with the oxygen containing gas. The particulate matter may be provided as loose filling within the chamber.

For example, the particulate matter initially provided to the combustion chamber may comprise 60%-90%, preferably 70%-80% of particulate (elementary) metal and 10%-40%, preferably 20%-30% of particulate carrier material, wherein the particulate carrier material may comprise further particulate material in addition to or instead of particulate metal oxide. During the combustion the ratio of the particulate carrier material may raise, due to the combustion process, in particular if no further particulate metal is added to the combustion chamber.

The oxygen containing gas is introduced at the bottom of the fluidized bed combustor under such conditions that the particulate matter is fluidized, wherein depending on the velocity of the provided oxygen containing gas the fluidized bed can be embodied as stationary, bubbling or circulating fluidized bed.

The oxygen containing gas may be a mixture of gases containing oxygen. Preferably, the oxygen containing gas is air. When using air as an oxygen containing gas nitrogen oxides may be produced during the combustion process, which can be removed in a conventional manner by a selective catalytic reaction (SCR) in the after treatment of the combustion gases.

In an alternative embodiment, pure oxygen may be provided as the oxygen containing gas. In this case the provided gas has only unavoidable contamination in addition to the oxygen ($O_2$). If pure oxygen is used in the combustion process with the metal, even the need for a SCR after treatment of the combustion process can be avoided.

The ignition device is embodied to provide temperatures at which an exothermic reaction between the particulate metal and the oxygen is started. The ignition device is in particular embodied to provided temperatures above 1.400° C. The ignition device may be embodied as electrical operated heater or as a burner operated with gas.

In order to provide a closed loop incineration apparatus: the combustion chamber has an combustion chamber outlet for combustion gases and particulate matter, the reaction chamber has an reaction chamber inlet for particulate matter, the reaction chamber has an reaction chamber outlet for the reaction gas and particulate matter and the combustion chamber has an combustion chamber inlet for particulate matter, wherein the combustion chamber outlet is connected to the reaction chamber inlet and/or wherein the reaction chamber outlet is connected to the combustion chamber inlet.

This way particulate metal oxide produced by the combustion in the combustion chamber of the fluidized bed combustor is provided to the reaction chamber of the fluidized bed redox reactor and/or particulate metal produced in the reaction chamber of the fluidized bed redox reactor is provided to the combustion chamber of the fluidized bed combustor.

Accordingly, the particulate combustion products of the fluidized bed combustor can be supplied to the fluidized bed redox reactor, whereas the particulate reaction products of the fluidized bed redox reactor can in turn be provided to the fluidized bed combustor. In particular, the particulate combustion products of the fluidized bed combustor may comprise particulate metal (with a content between 60% and 90%) and particulate metal oxide (with a content between 10% and 40%). The particulate reaction products of the fluidized bed redox reactor may comprise particulate metal oxide (with a content between 60% and 90%) and particulate metal (with a content between 10% and 40%). Of course, further particulate contaminations may be included.

Preferably, a respective particulate matter separator is associated with the reaction chamber outlet and/or a with the combustion chamber outlet, so that particulate matter comprising particulate metal oxide produced by the combustion reaction in the combustion chamber is separated from gaseous combustion gases and/or so that particulate matter comprising particulate metal produced in the reaction chamber of the fluidized bed redox reactor is separated from the reaction gas of the redox reaction. Accordingly, at least one separator may be assigned to the fluidized bed combustor and at least one separator may be assigned to the at least one fluidized bed redox reactor. For example, the separators may be embodied as cyclone or filter.

According to the invention the incineration apparatus comprises an electrolysis unit for producing hydrogen and oxygen having a hydrogen outlet for the produced hydrogen, wherein the hydrogen outlet is connected to the reducing agent inlet of the fluidized bed redox reactor.

The electrolysis unit for producing hydrogen and oxygen also has an oxygen outlet for the produced oxygen, wherein the oxygen outlet is connected to the oxidizer inlet of the fluidized bed combustor.

This way the electrolysis unit may be operated to produce oxygen and hydrogen, wherein the produced hydrogen may be provided as the hydrogen containing gas to the reaction chamber of the fluidized bed redox reactor and/or the produced oxygen may be provided as the oxygen containing gas to the combustion chamber of the fluidized bed combustor.

If the electrolysis unit is solely operated by electrical energy generated by renewable energy the process gases (H2 an O2) can be produced climate neutral.

In this regard it is also suggested that at least one respective storage vessel is provided for at least one of the following: particulate matter comprising predominantly particulate metal produced in the fluidized bed redox reactor, particulate matter comprising predominantly particulate metal oxide produced in the fluidized bed combustor, oxygen produced by the electrolysis unit, hydrogen produced by the electrolysis unit.

This way, at least one of the following is stored in a respective vessel: particulate matter comprising particulate metal produced in the fluidized bed redox reactor, preferably under an inert atmosphere (i.e., nitrogen atmosphere) particulate matter comprising particulate metal oxide produced in the fluidized bed combustor, oxygen produced by the electrolysis unit, hydrogen produced by the electrolysis unit.

Accordingly, the produced substances can be stored independent of each other. This has the advantage, that the fluidized bed combustor and the fluidized bed redox reactor can be operated independently of each other. For example, in case there is a surplus of renewable energy, the fluidized bed redox reactor is operated by suppling hydrogen of the electrolysis unit and by providing particulate matter comprising particulate metal oxide stored in the respective vessel. The particulate matter produced by the redox reaction in the fluidized bed redox reactor comprising predominantly particulate metal can then be stored in a further vessel. In case of a shortage of renewable energy the fluidized bed combustor can be operated by suppling particulate matter from the respective vessel, which contains particulate matter comprising predominantly particulate metal produced by the fluidized bed redox reactor, and by supplying pure oxygen stored in a respective vessel, which was previously produced by the electrolysis unit. The particulate matter produced by the fluidized bed combustor comprising predominantly particulate metal oxide could then be stored in the respective vessel again.

Preferably the metal of the particulate metal is of the following group: Iron (Fe), in particular elementary Iron, Zinc (Zn), in particular elementary Zinc, Alkali metal, in particular Magnesium (Mg), preferably elementary Magnesium.

Accordingly, the particulate metal oxide is Iron oxide, such as FeO, Fe2O, Fe3O4 and Fe2O3, zinc oxide, such as ZnO, or Magnesium oxide, such as MgO, respectively.

The invention and the technical background will now be explained with regard to the FIG. 1, which shows an exemplary embodiment of the invention.

The FIGURE depicts an incineration apparatus, comprising a fluidized bed combustor 1, a fluidized bed redox reactor 2 and an electrolysis unit 13.

The fluidized bed combustor 1 comprises a combustion chamber 3, an oxidizer inlet 4, a combustion chamber inlet 7 and a combustion chamber outlet 6. An ignition device 5 is arranged within the combustion chamber 3. A particulate matter separator 12a is arranged next to the combustion chamber outlet 6.

The fluidized bed redox reactor 2 comprises a reaction chamber 8, a reducing agent inlet 9, a reaction chamber inlet 10 and a reaction chamber outlet 11. A particulate matter separator 12b is arranged next to the reactor chamber outlet 11.

The electrolysis unit 13 for producing oxygen and hydrogen comprises a hydrogen outlet 14 and an oxygen outlet 15. The electrolysis unit 13 is preferably operated by renewable energy. The produced oxygen can be directly supplied to the oxidizer inlet 4 or can be stored in storage vessel 16b. The produced hydrogen can be either supplied directly to the reducing agent inlet 9 or can be stored in storage vessel 16d.

In storage vessel 16a particulate matter comprising predominantly particulate metal and particulate metal oxide as carrier material is stored. This particulate matter can be supplied to the combustion chamber 3. For operating the fluidized bed combustor 1 oxygen is supplied to the oxidizer inlet 4 so that the particulate matter within the combustion chamber 3 is fluidized. In addition to the pure oxygen air or another gas may be supplied to the oxidizer inlet 4. In order to start an exothermic combustion reaction, the temperature within the combustion chamber 3 is locally raised by the ignition device 5 so that the particulate metal reacts with the provided oxygen.

Particulate matter leaving the combustion chamber 3 through combustion chamber outlet 6 is separated from gaseous components within the particulate matter separator 12a, which is embodied as a cyclone. The particulate matter leaving the combustion chamber 3 comprises mainly particulate metal oxide and particulate metal as a minor component. The particulate matter separated in the particulate matter separator 12a is then either returned into the combustion chamber 3 or is further supplied to storage vessel 16c or to the fluidized bed redox reactor 2.

The fluidized bed redox reactor 2 is operated by supplying hydrogen to the reducing agent inlet 9. By supplying hydrogen, the particulate matter within the reaction chamber 8 is fluidized, wherein at least initially the particulate matter comprises mainly particulate metal oxide as main component and particulate metal as secondary (minor) components. The particulate metal oxide performs a redox reaction with the hydrogen, so that particulate metal and water steam is produced. The particulate matter leaving the reaction chamber 8 through the reaction chamber outlet 11 is separated in particulate matter separator 12b from the gaseous components (water steam). The separated particulate matter can be stored in storage vessel 16a or can be directly further supplied to the fluidized bed combustor 1.

The shown exemplary embodiment has the advantage that particulate matter comprising mainly particulate metal oxide (stored in vessel 16c) can be transferred to particulate matter comprising mainly particulate metal by reaction with hydrogen in the fluidized bed redox reactor, when there is a surplus of renewable energy (and the hydrogen is produced by the electrolysis unit 13). The thus derived particulate matter can be stored in storage vessel 16a. In turn, if there is a shortage of renewable energy, the stored particulate matter (comprising mainly particulate metal) can be supplied to the fluidized bed combustor 1 and combusted with the oxygen stored in storage vessel 16b, wherein the thereby produced thermal energy can be transferred to electrical energy. This way, it is possible to store energy in form of particulate matter comprising mainly particulate metal.

What is claimed is:

1. An incineration apparatus comprising:
 a fluidized bed redox reactor having:
   a reaction chamber with particulate matter comprising particulate metal oxide, and
   a fluidized bottom with a reducing agent inlet for a gas to fluidize the particulate matter;
 a fluidized bed combustor having:
   a combustion chamber with particulate matter comprising particulate metal,
   a fluidized bottom with an oxidizer inlet for an oxygen containing gas to fluidize the particulate matter, and
   an ignition device embodied to at least locally raise the temperature within the combustion chamber to cause an exothermic combustion reaction of the particulate metal with the oxygen containing gas; and
 an electrolysis unit for producing hydrogen gas and oxygen having:
   a hydrogen outlet for the produced hydrogen gas, and
   an oxygen outlet for the produced oxygen,
   wherein the oxygen outlet is connected to the oxidizer inlet of the fluidized bed combustor and the hydrogen outlet is connected to the reducing agent inlet of the fluidized bed redox reactor, so that the hydrogen containing gas fluidizes the particulate matter comprising particulate metal oxide, and wherein in the resulting fluidized bed the particulate metal oxide reacts with the hydrogen gas to produce particulate metal and water.

2. The incineration apparatus according to claim 1, the combustion chamber having a combustion chamber outlet for combustion gases and particulate matter, the combustion chamber having a combustion chamber inlet for particulate matter, the reaction chamber having a reaction chamber inlet for particulate matter and/or the reaction chamber having a reaction chamber outlet for reaction gas and particulate matter, wherein the combustion chamber outlet is connected to the reaction chamber inlet and/or wherein the reaction chamber outlet is connected to the combustion chamber inlet.

3. The incineration apparatus according to claim 2, further comprising at least one of:

a particulate matter separator connected to the reaction chamber outlet, and a particulate matter separator connected to the combustion chamber outlet.

4. The incineration apparatus according to claim 1, further comprising a respective storage vessel for at least one of:

particulate matter comprising predominantly particulate metal produced in the fluidized bed redox reactor, particulate matter comprising predominantly particulate metal oxide produced in the fluidized bed combustor, oxygen produced by the electrolysis unit and to be supplied to the fluidized bed combustor, and hydrogen produced by the electrolysis unit and to be supplied to the fluidized bed redox reactor.

5. The incineration bed apparatus according to claim 1, wherein the metal oxide is selected from the group consisting of iron oxide, zinc oxide, and magnesium oxide.

6. A method for operating an incineration apparatus, the method comprising:

providing particulate metal oxide to a reaction chamber of a fluidized bed redox reactor, providing a gas to a fluidized bottom of the fluidized bed redox reactor such that the particulate metal oxide is fluidized, providing particulate metal to a combustion chamber of a fluidized bed combustor, providing an oxygen containing gas to a fluidized bottom of the fluidized bed combustor such that particulate matter comprising the particulate metal is fluidized, raising at least locally the temperature within the combustion chamber to cause an exothermic combustion reaction of the particulate metal with the oxygen containing gas, operating an electrolysis unit to produce oxygen and hydrogen gas, providing the produced hydrogen gas as hydrogen containing gas to the reaction chamber of the fluidized bed redox reactor, wherein the particulate metal oxide reacts with the hydrogen gas to produce particulate metal and water, and providing the produced oxygen as the oxygen containing gas to the combustion chamber of the fluidized bed combustor.

7. The method according to claim 6, wherein particulate metal oxide produced by combustion in the combustion chamber of the fluidized bed combustor is provided to the reaction chamber of the fluidized bed redox reactor, and wherein particulate metal produced in the reaction chamber of the fluidized bed redox reactor is provided to the combustion chamber of the fluidized bed combustor.

8. The method according to claim 6, wherein particulate metal oxide produced by the combustion reaction in the combustion chamber of the fluidized bed combustor is separated from combustion gases.

9. The method according to claim 6, further comprising storing in a respective storage vessel at least one of:

particulate matter comprising particulate metal produced in the fluidized bed redox reactor, particulate matter comprising particulate metal oxide produced in the fluidized bed combustor, oxygen produced by the electrolysis unit, and hydrogen produced by the electrolysis unit.

10. The method according to claim 6, wherein particulate metal produced in the reaction chamber of the fluidized bed redox reactor is separated from a reaction gas of a redox reaction.

* * * * *